United States Patent
Cannillo et al.

(10) Patent No.: US 12,027,982 B2
(45) Date of Patent: Jul. 2, 2024

(54) HYBRID MULTI-LEVEL POWER CONVERTER WITH INTER-STAGE INDUCTOR

(71) Applicant: Dialog Semiconductor (UK) Limited, London (GB)

(72) Inventors: Francesco Cannillo, Munich (DE); Holger Petersen, Pastetten (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 17/967,457

(22) Filed: Oct. 17, 2022

(65) Prior Publication Data

US 2023/0041093 A1  Feb. 9, 2023

Related U.S. Application Data

(62) Division of application No. 16/919,928, filed on Jul. 2, 2020, now Pat. No. 11,515,793.

(30) Foreign Application Priority Data

Jan. 27, 2020 (DE) .................. 102020200927.9

(51) Int. Cl.
 *H02M 3/158* (2006.01)
 *G05F 1/595* (2006.01)
 (Continued)

(52) U.S. Cl.
 CPC .......... *H02M 3/1584* (2013.01); *G05F 1/595* (2013.01); *H02M 1/0095* (2021.05); *H02M 3/07* (2013.01);
 (Continued)

(58) Field of Classification Search
 CPC ...... H02M 1/0095; H02M 3/07; H02M 3/158; H02M 1/0006; H02M 1/0025
 See application file for complete search history.

(56) References Cited

U.S. PATENT DOCUMENTS 6,963,497 B1  11/2005  Herbert
7,782,027 B2   8/2010  Williams
(Continued)

FOREIGN PATENT DOCUMENTS

DE  10 2015 209 330 A1  11/2016
DE     102015212331 A1   1/2017
(Continued)

OTHER PUBLICATIONS

U.S. Office Action, U.S. Appl. No. 16/919,928, Applicant: Cannillo et al., dated Jan. 27, 2022, 22 pages.
(Continued)

*Primary Examiner* — Jue Zhang
*Assistant Examiner* — Lakaisha Jackson
(74) *Attorney, Agent, or Firm* — Saile Ackerman LLC; Stephen B. Ackerman (57) ABSTRACT

The present document relates to a power converter comprising an inductor, a first stage, and a second stage. The first stage may be coupled between an input of the power converter and the inductor, and the first stage may comprise a first flying capacitor. The second stage may be coupled between the inductor and an output of the power converter, and the second stage may comprise a second flying capacitor. A second terminal of the first flying capacitor may be connected to a first terminal of the inductor, and a first terminal of the second flying capacitor may be connected to a second terminal of the inductor.

13 Claims, 6 Drawing Sheets

(51) Int. Cl.
 H02M 1/00 (2006.01)
 H02M 3/07 (2006.01)
(52) U.S. Cl.
 CPC .......... *H02M 3/158* (2013.01); *H02M 1/0006* (2021.05); *H02M 1/0025* (2021.05)

(56) References Cited

U.S. PATENT DOCUMENTS

| | | | |
|---|---|---|---|
| 8,427,113 | B2 | 4/2013 | Xing |
| 9,559,589 | B2 | 1/2017 | Petersen |
| 10,003,261 | B2 | 6/2018 | Petersen et al. |
| 10,218,255 | B1 | 2/2019 | Petersen |
| 10,389,237 | B1 | 8/2019 | Chee et al. |
| 10,615,697 | B1 | 4/2020 | Ferrari |
| 10,622,890 | B1 | 4/2020 | Lidsky |
| 10,727,747 | B2 | 7/2020 | Macri |
| 10,756,623 | B1 | 8/2020 | Petersen |
| 10,790,742 | B1 | 9/2020 | Petersen |
| 10,804,798 | B1 | 10/2020 | Rizzolatti |
| 10,811,974 | B1 | 10/2020 | Petersen |
| 10,826,395 | B2 | 11/2020 | Song |
| 10,879,801 | B2 | 12/2020 | Zhang |
| 11,011,988 | B1 | 5/2021 | Jefremow |
| 11,011,991 | B1 | 5/2021 | Mercer |
| 11,228,243 | B2 | 1/2022 | Petersen |
| 11,515,793 | B2 | 11/2022 | Cannillo |
| 2008/0239772 | A1 | 10/2008 | Oraw et al. |
| 2015/0084611 | A1 | 3/2015 | Agrawal et al. |
| 2016/0344214 | A1 | 11/2016 | Petersen |
| 2017/0126146 | A1 | 5/2017 | Petersen |
| 2017/0149337 | A1 | 5/2017 | Petersen |
| 2017/0163157 | A1 | 6/2017 | Petersen |
| 2017/0302093 | A1 | 10/2017 | Petersen |
| 2018/0175726 | A1 | 6/2018 | Petersen |
| 2019/0280618 | A1* | 9/2019 | Yan .............. H02M 3/158 |
| 2020/0044578 | A1 | 2/2020 | Mangudi |
| 2020/0204076 | A1* | 6/2020 | Melanson .......... H02M 3/1582 |
| 2020/0212795 | A1 | 7/2020 | Das |
| 2021/0152082 | A1 | 5/2021 | Ozanoglu |
| 2021/0203179 | A1 | 7/2021 | Gambetta |
| 2021/0234462 | A1 | 7/2021 | Cannillo |
| 2022/0038006 | A1 | 2/2022 | Ellis |

FOREIGN PATENT DOCUMENTS

| | | |
|---|---|---|
| DE | 102019002880 A1 | 10/2019 |
| EP | 3 582 383 A2 | 12/2019 |
| WO | 2014/154390 A1 | 10/2014 |

OTHER PUBLICATIONS

German Office Action, File No. 10 2020 200 927.9, Applicant: Dialog Semiconductor (UK) Limited, dated Feb. 24, 2022, 5 pages.

U.S. Notice of Allowance, U.S. Appl. No. 17/123,417, Applicant: Holger Petersen, dated Mar. 16, 2022, 36 pages.

U.S. Notice of Allowance, U.S. Appl. No. 16/919,928, Applicant: Cannillo et al., dated Jun. 13, 2022, 12 pages.

U.S. Notice of Allowance, U.S. Appl. No. 16/900,678, Applicant: Holger Petersen, dated Jun. 3, 2022, 20 pages.

"Multi-Level Conversion: High Voltage Choppers and Voltage-Source Inverters," by T.A. Meynard et al., PESC '92 Record. 23rd Annual IEEE Power Electronics Specialists Conference, Jun. 29-Jul. 3, 1992, pp. 397-403.

"A Hybrid Switched-Capacitor/Inductor Converter for Small Conversion Ratios," by Norah Elena Nakibuuka, Thesis: M. Eng., Massachusetts Institute of Technology, Department of Electrical Engineering and Computer Science, 2013, May 2013, 69 pages.

"Zero Inductor Voltage Multilevel Bus Converter," by Samuel Webb et al., 2018 IEEE Applied Power Electronics Conference and Exposition (APEC), Mar. 4-8, 2018, pp. 2175-2182.

"A Fully-Integrated Switched-Capacitor 2:1 Voltage Converter with Regulation Capability and 90% Efficiency at 2.3A/mm$^2$," by Leland Chang et al., 2010 Symposium on VLSI Circuits/Technical Digest of Technical Papers, Jul. 2010, pp. 55-56.

"A Flying Capacitor Multilevel Converter with Sampled Valley-Current Detection for Multi-Mode Operation and Capacitor Voltage Balancing," by Jan S. Rentmeister et al., 2016 IEEE Energy Conversion Congress and Exposition (ECCE), Sep. 18-22, 2016, 8 pages.

"A New Approach to Low Ripple-Noise Switching Converters On the Basis of Switched-Capacitor Converters," by Tohru Umeno et al., 1991., IEEE International Sympoisum on Circuits and Systems, Jun. 11-14, 1991, pp. 1077-1080.

"Hybrid Buck Converter Optimization and Comparison for Smart Phone Integrated Battery Chargers," by Gabriel Gabian et al., 2018 IEEE Applied Power Electronics Conference and Exposition (APEC), Mar. 4-8, 2018, pp. 2148-2154.

"72 V Hybrid DC-to-DC Converter Reduces Intermediate Bus Converter Size by up to 50%," by Bruce Haug, Analog Dialogue 52-02, Feb. 2018, found: analogdialogue.com, pp. 1-3.

German Office Action, File No. 10 2020 200 927.9, Applicant: Dialog Semiconductor (UK) Limited, dated Jul. 7, 2020, 6 pages.

* cited by examiner

HYBRID MULTI-LEVEL POWER CONVERTER WITH INTER-STAGE INDUCTOR

This application is a Divisional application of (DS 19-085S) U.S. application Ser. No. 16/919,928, filed on Jul. 2, 2020, owned by a common assignee and which is herein incorporated by reference in its entirety.

TECHNICAL FIELD

The present document relates to power converters. In particular, the present document relates to hybrid multi-level power converters with improved efficiency.

BACKGROUND

There is an increasing demand for high-efficiency, regulated power converters in several market segments such as e.g. solid-state drives (SSDs), computing device, charging devices, or wearable power management integrated circuits (PMICs). Specifically, it is highly desirable to design power converters with higher efficiency and smaller area than conventional buck converters.

SUMMARY

Within this document, hybrid multi-level power converters are proposed. At this, the term "multi-level" indicates that the power converter comprises an inductor, and that the power converter is capable of applying more than two different voltages across this inductor. Moreover, the present document concerns "hybrid" power converters, i.e. power converters comprising both flying capacitors and inductors. With regard to the overall area of the power converter, the sizes of the required inductors and flying capacitors are important design parameters. Thus, it is important to reduce the sizes of the latter circuit elements.

Moreover, there is a demand for power converters that perform power conversion with a small input-to-output voltage conversion ratio $V_{OUT}/V_{IN}$, in particular when $V_{OUT}/V_{IN}<1/4$. As a further objective, it is advantageous to the converter efficiency to limit the voltage across the inductor during the operation of the power converter.

The present document addresses the above-mentioned technical problems.

According to an aspect, a buck power converter is presented. The buck power converter may comprise an inductor, a first stage, and a second stage. The first stage may be coupled between an input of the buck power converter and the inductor, and the first stage may comprise a first flying capacitor. The second stage may be coupled between the inductor and an output of the buck power converter, and the second stage may comprise a second flying capacitor.

The buck power converter may be configured to regulate an output voltage at the output of the buck power converter which is smaller than an input voltage at the input of the buck power converter. To this end, the buck power converter may comprise a plurality of switching elements for controlling the currents flowing through the components of the buck power converter. Further, the buck power converter may comprise a feedback loop for comparing said output voltage (or an output current) against a reference value and generating respective control signals for controlling the plurality of switching elements.

In general, the first and second flying capacitors may be passive electronic components capable of storing electrical energy in an electric field. The capacitors may have different capacitances or may have the same capacitance. Each capacitor may comprise a first terminal and a second terminal. The term 'flying' may come from the fact that one terminal of the capacitor is connected to different reference voltages during the converter operation. Therefore, it is like the charged capacitor flies from a voltage to another.

A second terminal of the first flying capacitor may be connected to a first terminal of the inductor, and a first terminal of the second flying capacitor may be connected to a second terminal of the inductor. In other words, the first flying capacitor, the inductor, and the second flying capacitor may form a serial connection between the input of the buck power converter and the output of the buck power converter.

The first stage may comprise a reservoir capacitor, and the buck power converter may be configured to alternately couple a first terminal of the reservoir capacitor to the second terminal of the first flying capacitor (which may be connected to the inductor), or to a first terminal of the first flying capacitor. As a second terminal of the reservoir capacitor may be connected to a reference potential (such as e.g. ground), the reservoir capacitor may discharge and contribute to a current flowing though the inductor in the first case, whereas, in the second case, the first flying capacitor may charge the reservoir capacitor.

The first stage may comprise a first switching element coupled between the input of the buck power converter and the first terminal of the first flying capacitor. The first stage may comprise a second switching element coupled between the first terminal of the first flying capacitor and an intermediate node. The first stage may comprise a third switching element coupled between the intermediate node and the second terminal of the first flying capacitor. The first stage may comprise a fourth switching element coupled between the second terminal of the first flying capacitor and a reference potential. The reservoir capacitor may be coupled between the intermediate node and the reference potential. In particular, the first terminal of the reservoir capacitor may be connected to the intermediate node, and the second terminal of the reservoir capacitor may be connected to the reference potential.

Throughout this document, the term "reference potential" is meant in its broadest possible sense. In particular, the reference potential is not limited to ground i.e. a reference potential with a direct physical connection to earth. Rather, the term "reference potential" may refer to any reference point to which and from which electrical currents may flow or from which voltages may be measured. Moreover, it should be mentioned that the reference potentials mentioned in this document may not necessarily refer to the same physical contact. Instead, the reference potentials mentioned in this document may relate to different physical contacts although reference is sometimes made to "the" reference potential for ease of presentation.

Each switching element may be implemented with any suitable device, such as, for example, a metal-oxide-semiconductor field effect transistor (MOSFET), an insulated-gate bipolar transistor (IGBT), a MOS-gated thyristor, or other suitable power devices. Each switching element may have a gate to which a driving voltage or control signal may be applied to turn the respective switching element on (i.e. to close the switching element) or turn the respective switching element off (i.e. to open the switching element).

The second stage may comprise a fifth switching element coupled between the first terminal of the second flying capacitor and the output of the buck power converter. The second stage may comprise a sixth switching element coupled between the output of the buck power converter and a second terminal of the second flying capacitor. The second stage may comprise a seventh switching element coupled between the second terminal of the second flying capacitor and a reference potential.

The buck power converter may be configured to establish, in a magnetizing state, a first magnetizing current path from the input of the buck power converter, via the first flying capacitor, via the inductor, and via the second flying capacitor to the output of the buck power converter. The buck power converter may be configured to establish, in the magnetizing state, a second magnetizing current path from the reservoir capacitor, via the inductor, and via the second flying capacitor to the output of the buck power converter. For this purpose, the buck power converter may be configured, in the magnetizing state, to close the first switching element, the third switching element, and the sixth switching element, and to open the remaining switching elements.

The buck power converter may be configured to establish, in a demagnetizing state, a demagnetizing current path from a reference potential, via the inductor to the output of the buck power converter. The buck power converter may be configured to establish, in the demagnetizing state, a first current path from a reference potential, via the first flying capacitor, via the reservoir capacitor, to the reference potential, and a second current path from the reference potential, via the second flying capacitor, to the output of the buck power converter. For this purpose, the buck power converter may be configured, in the demagnetizing state, to close the second switching element, the fourth switching element, the fifth switching element and the seventh switching element, and to open the remaining switching elements. The buck power converter may comprise an output capacitor connected between the output of the buck power converter and the reference potential. The power converter may be configured to switch between the magnetizing state and the demagnetizing state and control the switching elements accordingly.

The skilled person will readily understand that the adjective "magnetizing" is used here to describe the purpose of the magnetizing state and magnetizing current path, respectively. While in the magnetizing state, a current may flow along the magnetizing current path and may increase, resulting in an increase of the magnetic energy stored in the inductor. In other words, the inductor may be said to be "magnetized" during the magnetizing state. Analogously, the skilled person will readily understand that the adjective "demagnetizing" is used here to describe the purpose of the demagnetizing state and demagnetizing current path, respectively. While in the demagnetizing state, a current may flow along the demagnetizing current path and may decrease, resulting in a decrease of the magnetic energy stored in the inductor. In other words, the inductor may be said to be "demagnetized" during the demagnetizing state.

The buck power converter may be configured to establish, in an alternative magnetizing state, a first magnetizing current path from the input of the buck power converter, via the first flying capacitor, and via the inductor to the output of the buck power converter. The buck power converter may be configured to establish, in the alternative magnetizing state, a second magnetizing current path from the reservoir capacitor, and via the inductor, to the output of the buck power converter. The buck power converter may be configured to establish, in the alternative magnetizing state, a third current path from a reference potential, via the second flying capacitor, to the output of the buck power converter.

The buck power converter may be configured to establish, in an alternative demagnetizing state, a demagnetizing current path from a reference potential, via the inductor, and via the second flying capacitor to the output of the buck power converter.

The buck power converter may be configured to establish, in the alternative demagnetizing state, a current path from a reference potential, via the first flying capacitor, via the reservoir capacitor, to the reference potential.

The power converter may be configured to switch between the magnetizing state, the alternative magnetizing state, the demagnetizing state, and the alternative demagnetizing state, and control the switching elements accordingly.

According to another aspect, a boost power converter is presented. The boost power converter may comprise an inductor, a first stage coupled between an input of the boost power converter and the inductor, wherein the first stage comprises a first flying capacitor, and a second stage coupled between the inductor and an output of the boost power converter, wherein the second stage comprises a second flying capacitor.

The boost power converter may be configured to regulate an output voltage at the output of the boost power converter which is greater than an input voltage at the input of the boost power converter. To this end, the boost power converter may comprise a plurality of switching elements for controlling the currents flowing through the components of the boost power converter. Further, the boost power converter may comprise a feedback loop for comparing said output voltage (or an output current) against a reference value and generating respective control signals for controlling the plurality of switching elements.

A second terminal of the first flying capacitor may be connected to a first terminal of the inductor, and a first terminal of the second flying capacitor may be connected to a second terminal of the inductor.

The second stage may further comprise a reservoir capacitor, and the boost power converter may be configured to alternately couple a first terminal of the reservoir capacitor to the first terminal of the second flying capacitor, or to a second terminal of the second flying capacitor.

The second stage may comprise a first switching element coupled between the output of the boost power converter and the second terminal of the second flying capacitor. The second stage may comprise a second switching element coupled between the second terminal of the second flying capacitor and an intermediate node. The second stage may comprise a third switching element coupled between the intermediate node and the first terminal of the second flying capacitor. The second stage may comprise a fourth switching element coupled between the first terminal of the second flying capacitor and a reference potential, wherein the reservoir capacitor is coupled between said intermediate node and the reference potential.

The first stage may comprise a fifth switching element coupled between the second terminal of the first flying capacitor and the input of the boost power converter. The first stage may comprise a sixth switching element coupled between the input of the boost power converter and a first terminal of the first flying capacitor. The first stage may comprise a seventh switching element coupled between the first terminal of the first flying capacitor and a reference potential.

The boost power converter may be configured to establish, in a demagnetizing state, a first demagnetizing current path from the input of the boost power converter, via the first flying capacitor, via the inductor, and via the second flying capacitor to the output of the boost power converter. The boost power converter may be configured to establish, in the demagnetizing state, a second demagnetizing current path from the input of the boost power converter, via the first flying capacitor, via the inductor, and via the reservoir capacitor, to a reference potential.

The boost power converter may be configured to establish, in a magnetizing state, a magnetizing current path from the input of the boost power converter, via the inductor, to a reference potential. The boost power converter may be further configured to establish, in the magnetizing state, a first current path from a reference potential, via the reservoir capacitor, via the second flying capacitor, to the reference potential. The boost power converter may be further configured to establish, in the magnetizing state, a second current path from the input of the boost power converter, via the first flying capacitor, to the reference potential.

The boost power converter may be configured to establish, in an alternative demagnetizing state, a first demagnetizing current path from the input of the boost power converter, via the inductor, and via the second flying capacitor to the output of the boost power converter. The boost power converter may be configured to establish, in the alternative demagnetizing state, a second demagnetizing current path from the input of the boost power converter, via the inductor, and via the reservoir capacitor, to a reference potential. Moreover, the boost power converter may be configured to establish, in the alternative demagnetizing state, a current path from the input of the boost power converter, via the first flying capacitor to a reference potential.

The boost power converter may be configured to establish, in an alternative magnetizing state, a magnetizing current path from the input of the boost power converter, via the first flying capacitor, via the inductor, to a reference potential. The boost power converter may be further configured to establish, in the alternative magnetizing state, a current path from a reference potential, via the reservoir capacitor, via the second flying capacitor, to the reference potential.

According to another aspect, a method for operating a buck power converter is described. The method may comprise steps which correspond to the features of the buck power converter described in the present document. The buck power converter may comprise an inductor, a first stage with a first flying capacitor, and a second stage with a second flying capacitor. The method may comprise coupling the first stage between an input of the buck power converter and the inductor. The method may comprise coupling the second stage between the inductor and an output of the buck power converter.

The first stage may further comprise a reservoir capacitor. The method may comprise alternately coupling a first terminal of the reservoir capacitor to a first terminal of the first flying capacitor, or to a second terminal of the first flying capacitor.

The method may comprise establishing, in a magnetizing state, a first magnetizing current path from the input of the buck power converter, via the first flying capacitor, via the inductor, and via the second flying capacitor to the output of the buck power converter. The method may comprise establishing, in the magnetizing state, a second magnetizing current path from the reservoir capacitor, via the inductor, and via the second flying capacitor to the output of the buck power converter. The method may comprise establishing, in a demagnetizing state, a demagnetizing current path from a reference potential, via the inductor to the output of the buck power converter. The method may comprise establishing, in the demagnetizing state, a first current path from a reference potential, via the first flying capacitor, via the reservoir capacitor, to the reference potential. The method may comprise establishing, in the demagnetizing state, a second current path from the reference potential, via the second flying capacitor, to the output of the buck power converter.

According to yet another aspect, a method of operating a boost power converter is presented. The method may comprise steps which correspond to the features of the boost power converter described in the present document. The boost power converter may comprise an inductor, a first stage with a first flying capacitor, and a second stage with a second flying capacitor. The method may comprise coupling the first stage between an input of the boost power converter and the inductor. The method may comprise coupling the second stage between the inductor and an output of the boost power converter.

The second stage may further comprise a reservoir capacitor, and the method may further comprise alternately coupling a first terminal of the reservoir capacitor to the first terminal of the second flying capacitor, or to a second terminal of the second flying capacitor.

The method may comprise establishing, in a demagnetizing state, a first demagnetizing current path from the input of the boost power converter, via the first flying capacitor, via the inductor, and via the second flying capacitor to the output of the boost power converter. The method may comprise establishing, in the demagnetizing state, a second demagnetizing current path from the input of the boost power converter, via the first flying capacitor, via the inductor, and via the reservoir capacitor to a reference potential.

The method may comprise establishing, in a magnetizing state, a magnetizing current path from the input of the boost power converter, via the inductor, to a reference potential. The method may comprise establishing, in the magnetizing state, a first current path from a reference potential, via the reservoir capacitor, via the second flying capacitor, to the reference potential. The method may comprise establishing, in the magnetizing state, a second current path from the input of the boost power converter, via the first flying capacitor, to the reference potential.

The method may comprise establishing, in an alternative demagnetizing state, a first demagnetizing current path from the input of the boost power converter, via the inductor, and via the second flying capacitor to the output of the boost power converter. The method may comprise establishing, in the alternative demagnetizing state, a second demagnetizing current path from the input of the boost power converter, via the inductor, and via the reservoir capacitor, to a reference potential. Moreover, the method may comprise establishing, in the alternative demagnetizing state, a current path from the input of the boost power converter, via the first flying capacitor to a reference potential.

The method may comprise establishing, in an alternative magnetizing state, a magnetizing current path from the input of the boost power converter, via the first flying capacitor, via the inductor, to a reference potential. The method may comprise establishing, in the alternative magnetizing state, a current path from a reference potential, via the reservoir capacitor, via the second flying capacitor, to the reference potential.

According to a further aspect, a software program is described. The software program may be adapted for execution on a processor and for performing the method steps outlined in the present document when carried out by the processor.

According to another aspect, a storage medium is described. The storage medium may comprise a software program adapted for execution on a processor and for performing the method steps outlined in the present document when carried out by the processor.

According to a further aspect, a computer program product is described. The computer program product may comprise instructions for performing the method steps outlined in the present document when carried out by the processor.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The present invention is illustrated by way of example, and not by way of limitation, in the figures of the accompanying drawings in which like reference numerals refer to similar or identical elements, and in which.

DETAILED DESCRIPTION

Figure 1:
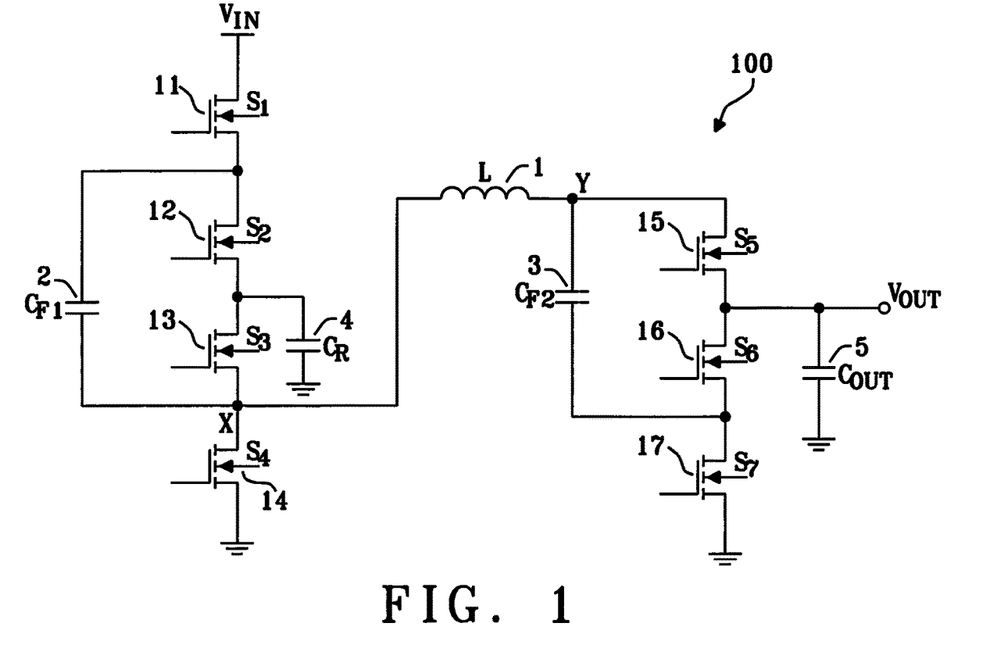
FIG. 1 shows an exemplary power converter.

FIG. 1 shows an exemplary power converter 100 according to the teachings of the present document. The exemplary power converter 100 comprises an inductor 1, a first stage, and a second stage. The first stage is coupled between an input of the power converter 100 and the inductor 1, capacitor 2 is connected to a first terminal of the inductor 1, and a first terminal of the second flying capacitor 3 is connected to a second terminal of the inductor 1.

The first stage of the exemplary power converter 100 comprises a first switching element 11 coupled between the input of the power converter and the first terminal of the first flying capacitor 2. It further comprises a second switching element 12 coupled between the first terminal of the first flying capacitor 2 and an intermediate node. The power converter 100 further comprises a third switching element 13 coupled between the intermediate node and the second terminal of the first flying capacitor 2, and a fourth switching element 14 coupled between the second terminal of the first flying capacitor 2 and a reference potential. A reservoir capacitor 4 is coupled between the intermediate node and the reference potential. The power converter 100 controls the second switching element 12 and the third switching element 13 such that a first terminal of the reservoir capacitor 4 is alternately coupled to (a) the second terminal of the first flying capacitor 2, or (b) to a first terminal of the first flying capacitor 2. In other words, in the first stage, the first flying capacitor $C_{F1}$ and the reservoir capacitor $C_R$ are alternately placed in series and in parallel, and therefore develop a voltage of $V_{IN}/2$ across them, wherein $V_{IN}$ denotes the input voltage at the input of power converter 100.

As illustrated in FIG. 1, the second stage comprises a fifth switching element 15 coupled between the first terminal of the second flying capacitor 3 and the output of the power converter, a sixth switching element 16 coupled between the output of the power converter and a second terminal of the second flying capacitor 3, and a seventh switching element 17 coupled between the second terminal of the second flying capacitor 3 and a reference potential. Moreover, an output capacitor 5 is typically connected between the output of the power converter and the reference potential. In the second stage, the second flying capacitor 3 is periodically connected to the output voltage $V_{OUT}$ of the power converter, therefore determining its average voltage.

The proposed power converter 100 may be operated in a forward direction denoted as buck mode, in which power converter 100 regulates an output voltage at the output of the buck power converter which is smaller than an input voltage at the input of the buck power converter. The buck mode is illustrated using respective current flows in FIGS. 2, 3, 5, and 6.

In the buck mode, the proposed power converter 100 may operate with only two states without the need of regulating the voltage of its flying capacitors 2 and 3. Indeed, the voltages across the flying capacitors are inherently determined by the power converter operation as will be discussed in the following description. For example, the power converter may switch between a magnetizing state and a demagnetizing state.

Figure 2:
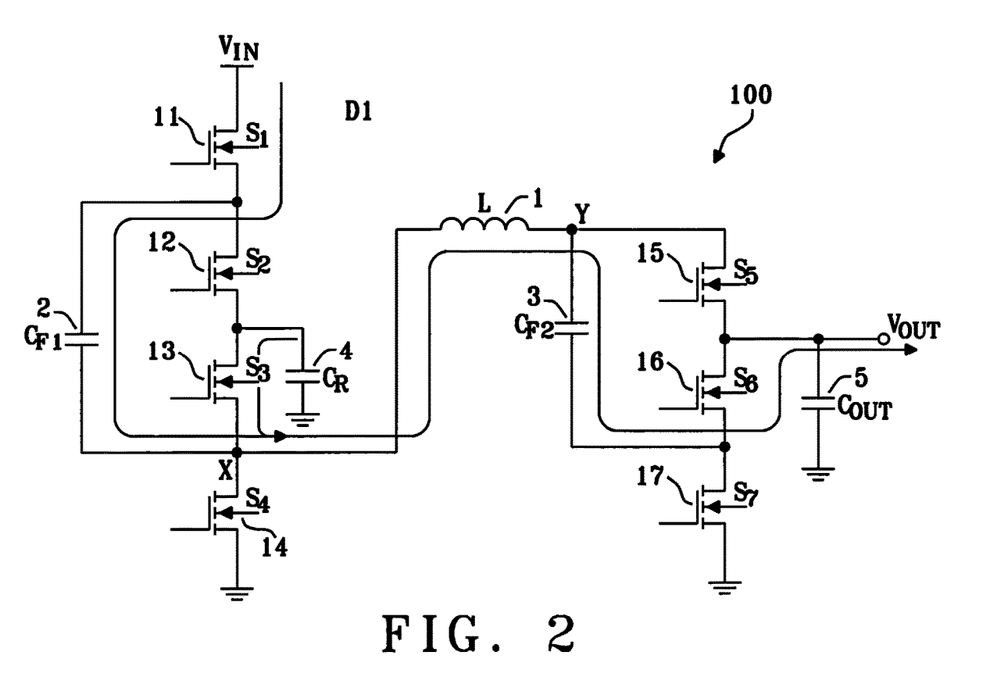
FIG. 2 shows current paths when the exemplary power converter is operated in a buck mode in a magnetizing state.

FIG. 2 shows current paths (illustrated by respective arrows) when the exemplary power converter is operated in a buck mode in a magnetizing state D1. During the magnetizing state D1, the inductor is magnetized. The voltage of node X is $V_{IN}/2$. The first 11 and the third 13 switching element are closed, and the second 12 and the fourth 14 switching element are open. Switching element 16 is closed and switching element 15 and 17 are open. Node Y is at a voltage $2V_{OUT}$. The inductor current is sourced by both the input voltage $V_{IN}$ via the first flying capacitor $C_{F1}$ (at a voltage of $V_{IN}/2$) and by the reservoir capacitor $C_R$ (charged at $V_{IN}/2$). The second flying capacitor $C_{F2}$ (at a voltage of $V_{OUT}$) decouples node Y from the output of the power converter.

In other words, the first flying capacitor and the second flying capacitor are placed in series between $V_{IN}$ and the reference potential during D1, and in parallel during demagnetizing state D2.

Figure 3:
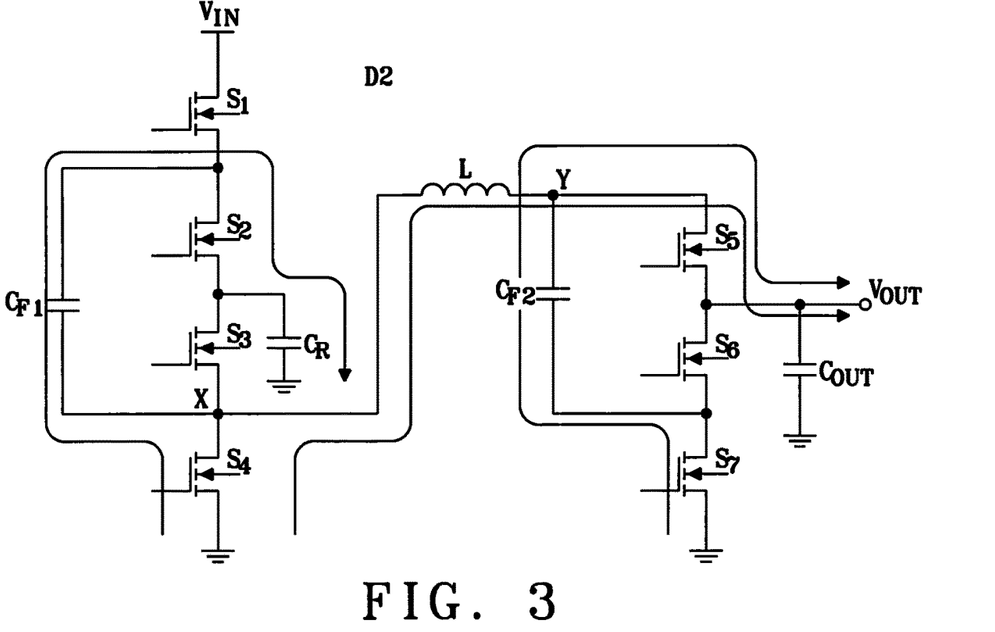
FIG. 3 shows current paths when the exemplary power converter is operated in a buck mode in a demagnetizing state.

FIG. 3 shows current paths when the exemplary power converter is operated in a buck mode in a demagnetizing state D2. During the demagnetizing state D2, the inductor is demagnetized by connecting node X to the reference potential and node Y to $V_{OUT}$. The first flying capacitor $C_{F1}$ is placed in parallel with the reservoir capacitor $C_R$ since S1 and S3 are open, and S2 and S4 are closed. The second flying capacitor $C_{F2}$ in parallel with the output capacitor $C_{OUT}$. S5 and S7 are closed, and S6 is open.

The charge balance of the flying and reservoir capacitors is guaranteed during the converter operation as the capacitors experience current flows with opposite directions during the two states D1 and D2. During the magnetizing state D1, the first flying capacitor $C_{F1}$ and the second flying capacitor $C_{F2}$ charge, while the reservoir capacitor $C_R$ discharges. During the demagnetizing state D2, $C_{F1}$ and $C_{F2}$ discharge, while $C_R$ charges. The relationship between input and output voltage is obtained by applying the volt-second balance principle (with D1=D and D2=1−D) to the inductor voltage $v_L$:

$$\frac{V_{OUT}}{V_{IN}} = \frac{0.5 \cdot D}{1+D} D \in [0, 1] \qquad (1)$$

Figure 4:
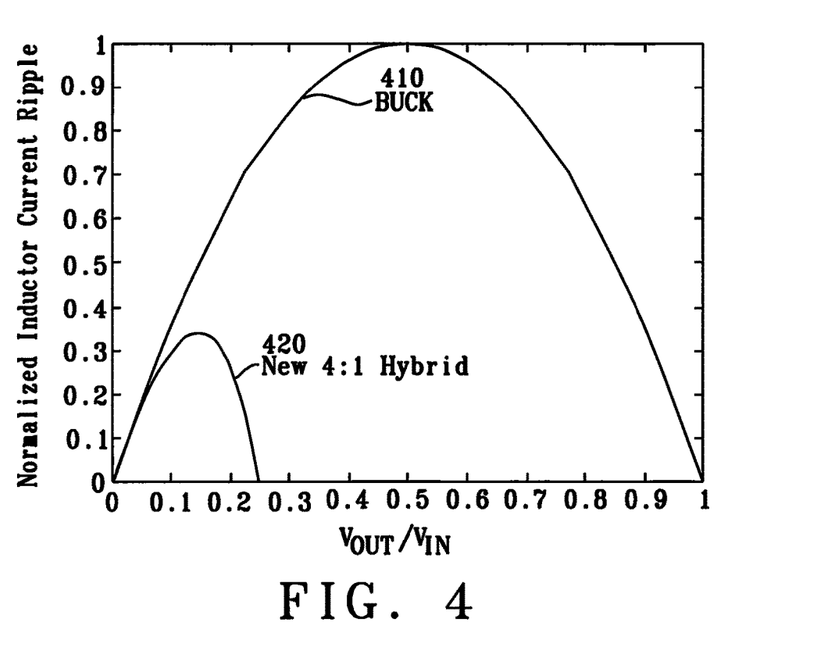
FIG. 4 shows inductor current ripple for different conversion ratios for a conventional buck power converter and for the proposed multi-level hybrid power converter operated in buck mode.

The maximum theoretical input-to-output conversion ratio $V_{OUT}/V_{IN}$ is 1/4 for D=1. FIG. 4 shows inductor current ripple $\Delta I_L$ for different conversion ratios for a conventional buck power converter 410 ($0 < V_{OUT}/V_{IN} < 1$) and for the proposed multi-level hybrid power converter operated in buck mode 420 ($0 < V_{OUT}/V_{IN} < 0.25$). Because of the reduced inductor current ripple $\Delta I_L$, inductor core losses are significantly reduced for $0 < V_{OUT}/V_{IN} < 0.25$.

Since the inductor is placed between the two stages, the average inductor current is reduced by the voltage conversion ratio of the second stage compared to topologies that use the inductor at the converter output. Therefore, for a given inductor, DCR losses are reduced by the square of the voltage conversion ratio of the second stage. The reduced current rating for the inductor also allows to reduce its physical dimensions.

Let us now examine the voltage rating of the FETs in the new converter. Devices with lower voltage rating have typically a better Figure of Merit (smaller specific resistance and smaller gate capacitance). In steady state conditions, the voltage rating for the devices of the new hybrid converter is:

$V_{IN}/2$ for S1, S2, S3, S4
$V_{OUT}$ for S5, S6, S7

The voltage rating is reduced compared to that of a conventional buck converter (requiring $V_{IN}$-rated devices).

Figure 5:
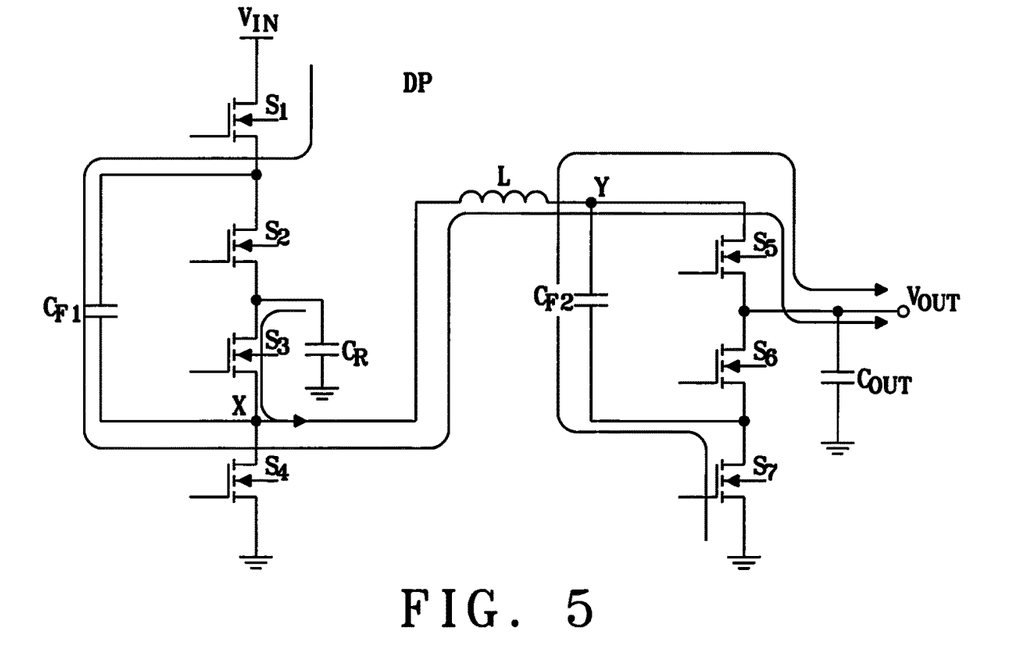
FIG. 5 shows current paths when the exemplary power converter is operated in a buck mode in an alternative magnetizing state.
Figure 6:
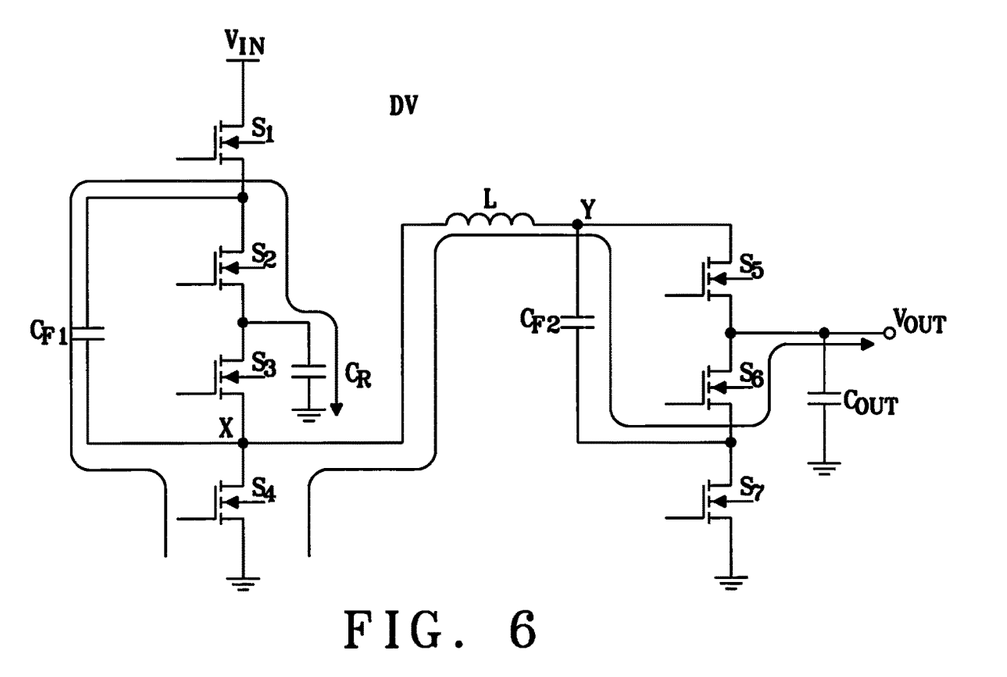
FIG. 6 shows current paths when the exemplary power converter is operated in a buck mode in an alternative demagnetizing state.

The operation of the power converter can be improved by allowing the flying capacitor of the second stage $C_{F2}$ to further provide part of the load current. This can be achieved by introducing two additional operation states DP and DV. FIG. 5 shows current paths when the exemplary power converter is operated in a buck mode in an alternative magnetizing state DP. FIG. 6 shows current paths when the exemplary power converter is operated in a buck mode in an alternative demagnetizing state DV.

During state DP, $C_{F2}$ is discharged to the output also during the magnetizing phase of the inductor (in the two-phase operation of FIGS. 3 and 4, this is limited to the demagnetizing state D2). During state DV, the charge on $C_{F2}$ is balanced by charging it. The charge balance is also guaranteed for $C_{F1}$ and $C_R$ as in the previously described two-phase operation of FIGS. 3 and 4.

In addition, phase DP can be used to reduce the drop of the output voltage when a transient load current has been applied. In a similar way operation phase DV can be inserted into the switching sequence to reduce output voltage overshoot, when load current is suddenly removed.

The duration of the phases DP and DV can be chosen in a way that limits the losses (non-adiabatic and conduction) due to the discharge current going from $C_{F2}$ to $C_{OUT}$.

Therefore, the magnetizing phase of the inductor can be split between states D1 and DP, while the demagnetizing phase can be split between states D2 and DV. The input-to-output voltage conversion ratio for two different example allocations of phase durations is reported below:

$$\frac{V_{OUT}}{V_{IN}} = \frac{3 \cdot D}{10} D1 = D, \qquad (2)$$

$$DP = 0, D2 = \frac{1}{3},$$

$$DV = \frac{2}{3} - DD \in \left[0, \frac{2}{3}\right]$$

$$\frac{V_{OUT}}{V_{IN}} = \frac{D}{3} D1 = DP = \frac{D}{2}, \qquad (3)$$

$$D2 = DV = \frac{1-D}{2} D \in [0, 1]$$

Therefore, in (2) and (3) the flying capacitor $C_{F2}$ is connected to $C_{our}$ for a fixed duration (during DP and D2): 1/3 and 1/2 of the switching period, respectively. The corresponding charging phase for $C_{F2}$ (during D1 and DV) is 2/3 or 1/2 of the switching period for cases (2) and (3), respectively. Therefore, the average $C_{F2}$ discharge current is twice or equal to the corresponding charge current in cases (2) and (3), respectively. This results in reduced peak current in switch S5, reduced (40% and 33%, respectively) average inductor current, and a different theoretical maximum input-to-output conversion ratio $V_{OUT}/V_{IN}$ (1/5 or 1/3, respectively). It should be noted that an operation with D close to 1 may only be considered theoretically, as the time interval for charge balancing of $C_{F1}$ (and $C_{F2}$) then approaches zero. From that the real-world maximum input-to-output conversion ratio typically remains $V_{OUT}/V_{IN} < 1/4$.

As already mentioned, the proposed power converter may be denoted as "multi-level" power converter, indicating that the power converter is capable of generating more than two different voltages across this inductor. Specifically, the voltages across the inductor are:

$V_{IN}/2 - 2V_{OUT}$ during D1
$V_{OUT}$ during D2
$V_{IN}/2 - V_{OUT}$ during DP
$-2V_{OUT}$ during DV.

The two converter stages may be integrated into a single converter unit, but alternatively also implemented inside separate units. As an example, switches S1-S4, the flying capacitor $C_{F1}$ and the inductor L could become part of a pre-converter stage generating a PWM signal with an average level close to the required bus voltage. Its operation may be limited to compensate the variations of the converter input voltage (line regulation). Switches S5-S7 and the flying capacitor $C_{F2}$, instead, can serve as a second stage that adapts its duty cycle to fine-tune the overall converter output voltage, i.e. handling the drop caused by variable load current (load regulation). The $2^{nd}$ stage may even be combined with the POL (Point of Load), i.e. go into the package of a microprocessor. This is supported by the fact that capacitors can store ~1000 times the energy of an inductor with the same volume, and by the fact that the switches need to handle only voltages in the range of the input voltage of the load. Therefore, the second stage could eventually become part of the microprocessor IC itself.

Figure 7:
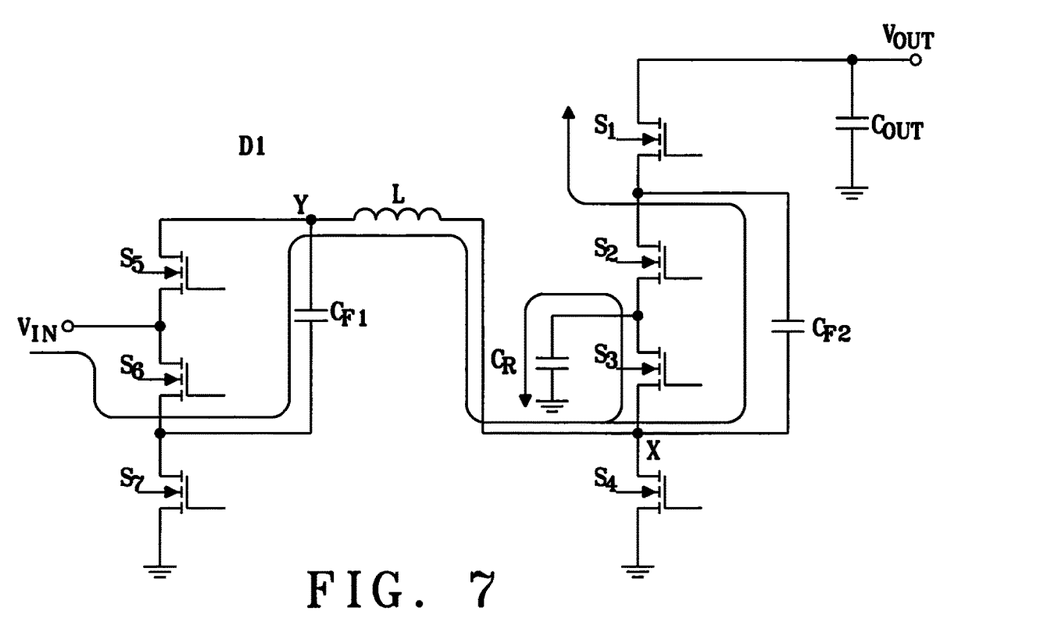
FIG. 7 shows current paths when the exemplary power converter is operated in a boost mode in a magnetizing state.
Figure 8:
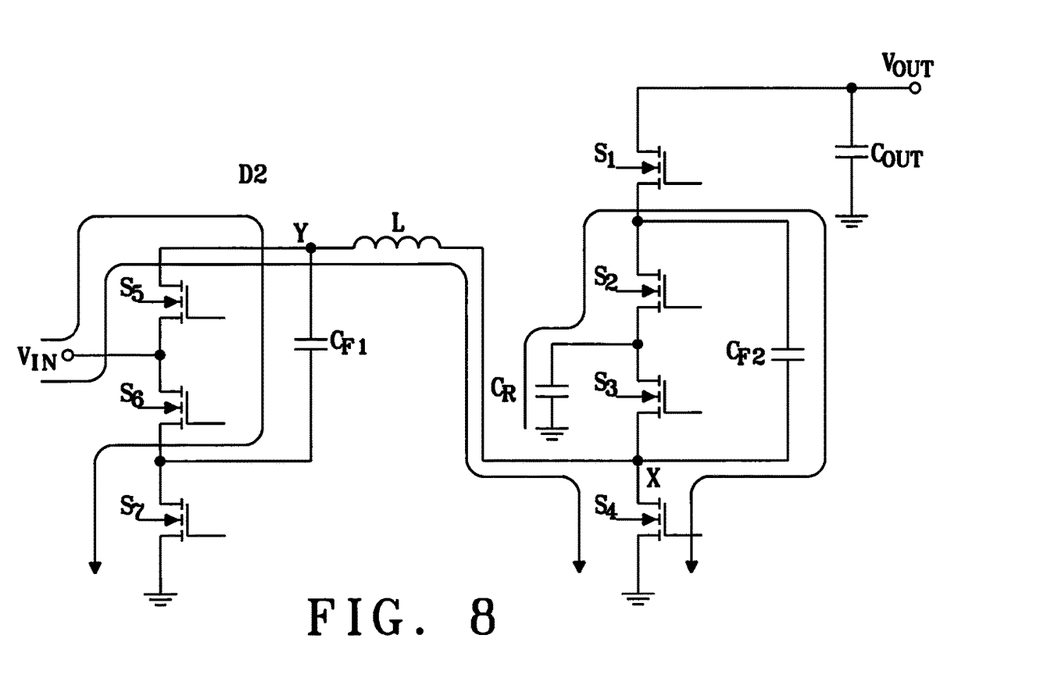
FIG. 8 shows current paths when the exemplary power converter is operated in a boost mode in a demagnetizing state.
Figure 9:
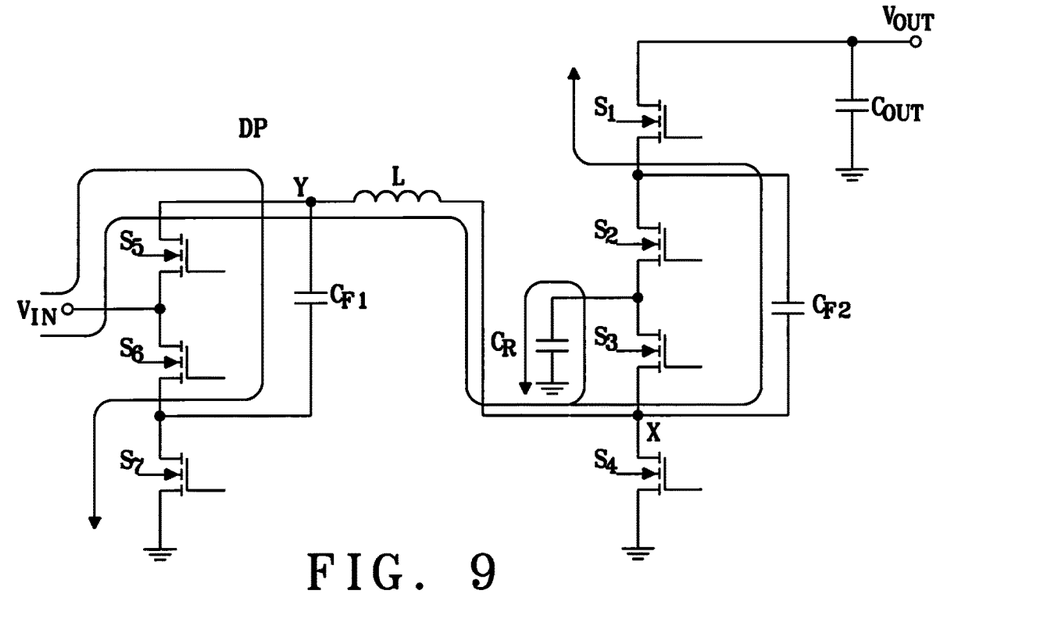
FIG. 9 shows current paths when the exemplary power converter is operated in a boost mode in an alternative magnetizing state.
Figure 10:
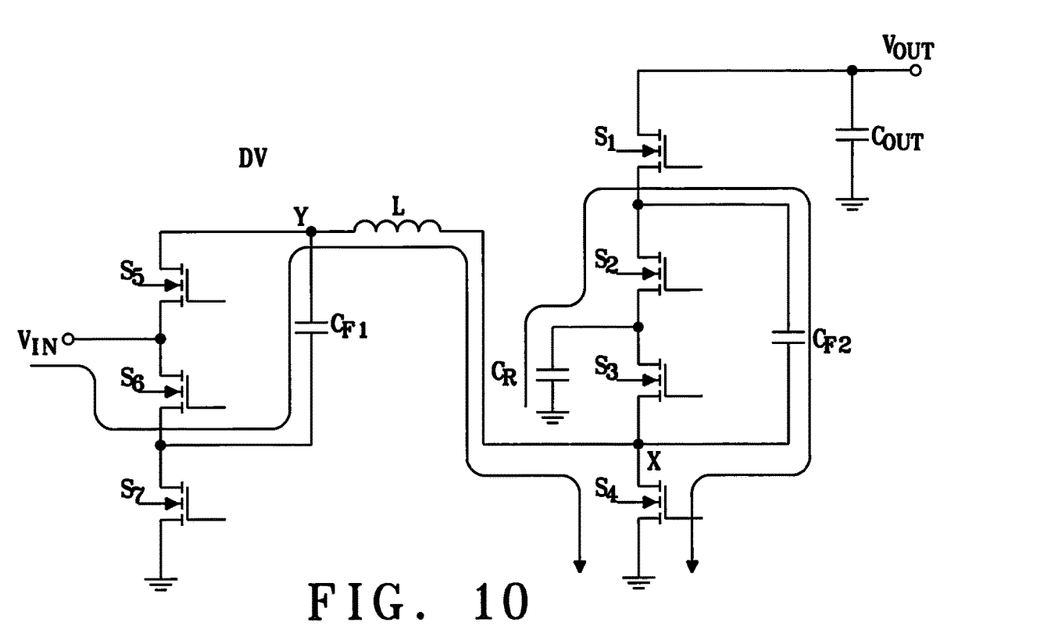
FIG. 10 shows current paths when the exemplary power converter is operated in a boost mode in an alternative demagnetizing state.

Finally, by inverting the roles of input and output ports the described topology can be used to perform an efficient boost power conversion with large conversion ratio. The magnetizing (de-magnetizing) phase in the buck operation becomes a de-magnetizing (magnetizing) phase in the boost operation. FIG. 7 shows current paths when the exemplary power converter is operated in a boost mode in a magnetizing state. FIG. 8 shows current paths when the exemplary power converter is operated in a boost mode in a demagnetizing state. The voltage on the flying capacitors $C_{F1}$ and $C_{F2}$ is $V_{OUT}/2$ and $V_{IN}$, respectively. During D1, the inductor is demagnetized and $C_{F1}$ and $C_{F2}$ discharge, while $C_R$ charges. During D2, $C_{F1}$ and $C_{F2}$ charge, while $C_R$ discharges. As for the buck operation, also for the boost operation it is possible to introduce two extra states as shown in FIGS. 9 and 10.

Figure 11:
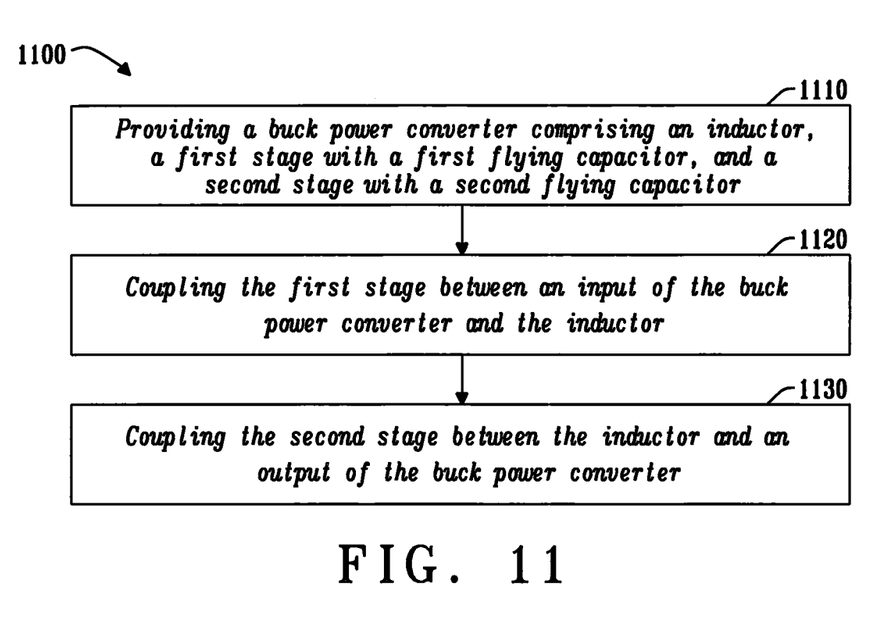
FIG. 11 shows a method for operating a buck power converter.

FIG. 11 shows 1100, a method for operating a buck power converter. The steps include 1110, providing a buck power converter, comprising an inductor, a first stage with a first flying capacitor, and a second stage with a second flying capacitor. The steps also include 1120, coupling the first stage between an input of the buck power converter and the inductor, and 1130, coupling the second stage between the inductor and an output of the buck power converter.

In summary, the proposed power converter offers the advantage that flying capacitor regulation is inherently achieved by the topology. That is, the voltage across the capacitors is defined by Kirchhoff Voltage Law (KVL) during the operation of the converter. Furthermore, the proposed power converter offers the following advantages: reduced voltage rating for MOSFET devices for the same input and output voltages, reduced losses associated to the inductor DCR (i.e. the direct current parasitic resistance DCR of the inductor) for the same output current, reduced current rating (thermal and saturation limit) for inductor, improved transient load response, and reduced peak input current ripple.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A boost power converter comprising
   an inductor,
   a first stage coupled between an input of the boost power converter and the inductor, wherein the first stage comprises a first flying capacitor, and
   a second stage coupled between the inductor and an output of the boost power converter, wherein the second stage comprises a second flying capacitor.

2. The boost power converter of claim 1, wherein
   a second terminal of the first flying capacitor is connected to a first terminal of the inductor, and
   a first terminal of the second flying capacitor is connected to a second terminal of the inductor.

3. The boost power converter of claim 2, wherein the second stage further comprises a reservoir capacitor, and the boost power converter is configured to alternately couple a first terminal of the reservoir capacitor
   to the first terminal of the second flying capacitor, or
   to a second terminal of the second flying capacitor.

4. The boost power converter of claim 3, wherein the second stage comprises
   a first switching element coupled between the output of the boost power converter and the second terminal of the second flying capacitor,
   a second switching element coupled between the second terminal of the second flying capacitor and an intermediate node,
   a third switching element coupled between the intermediate node and the first terminal of the second flying capacitor, and
   a fourth switching element coupled between the first terminal of the second flying capacitor and a reference potential,
   wherein the reservoir capacitor is coupled between the intermediate node and the reference potential.

5. The boost power converter of claim 3, wherein the first stage comprises
   a fifth switching element coupled between the second terminal of the first flying capacitor and the input of the boost power converter,
   a sixth switching element coupled between the input of the boost power converter and a first terminal of the first flying capacitor, and
   a seventh switching element coupled between the first terminal of the first flying capacitor and a reference potential.

6. The boost power converter of claim 3, wherein the boost power converter is configured to establish, in a demagnetizing state,
   a first demagnetizing current path from the input of the boost power converter, via the first flying capacitor, via the inductor, and via the second flying capacitor to the output of the boost power converter, and
   a second demagnetizing current path from the input of the boost power converter, via the first flying capacitor, via the inductor, and via the reservoir capacitor to a reference potential.

7. The boost power converter of claim 3, wherein the boost power converter is configured to establish, in a magnetizing state,
   a magnetizing current path from the input of the boost power converter, via the inductor, to a reference potential.

8. The boost power converter of claim 7, wherein the boost power converter is further configured to establish, in the demagnetizing state,
   a first current path from a reference potential, via the reservoir capacitor, via the second flying capacitor, to the reference potential, and
   a second current path from the input of the boost power converter, via the first flying capacitor, to the reference potential.

9. A method of operating a boost power converter comprising an inductor, a first stage with a first flying capacitor, and a second stage with a second flying capacitor, the method comprising
coupling the first stage between an input of the boost power converter and the inductor, and
coupling the second stage between the inductor and an output of the boost power converter.

10. The method of claim 9, wherein the second stage further comprises a reservoir capacitor, and the method comprises alternately coupling a first terminal of the reservoir capacitor
to the first terminal of the second flying capacitor, or
to a second terminal of the second flying capacitor.

11. The method of claim 10, wherein the method comprises establishing, in a demagnetizing state,
a first demagnetizing current path from the input of the boost power converter, via the first flying capacitor, via the inductor, and via the second flying capacitor to the output of the boost power converter, and
a second demagnetizing current path from the input of the boost power converter, via the first flying capacitor, via the inductor, and via the reservoir capacitor to a reference potential.

12. The method of claim 11, wherein the method comprises establishing, in a magnetizing state,
a magnetizing current path from the input of the boost power converter, via the inductor, to a reference potential.

13. The method of claim 12, wherein the method comprises establishing, in the magnetizing state,
a first current path from a reference potential, via the reservoir capacitor, via the second flying capacitor, to the reference potential, and
a second current path from the input of the boost power converter, via the first flying capacitor, to the reference potential.

* * * * *